G. CALVERT.
PROCESS FOR THE HYDROGENIZATION OF OILS.
APPLICATION FILED AUG. 26, 1914.
1,142,668.
Patented June 8, 1915.
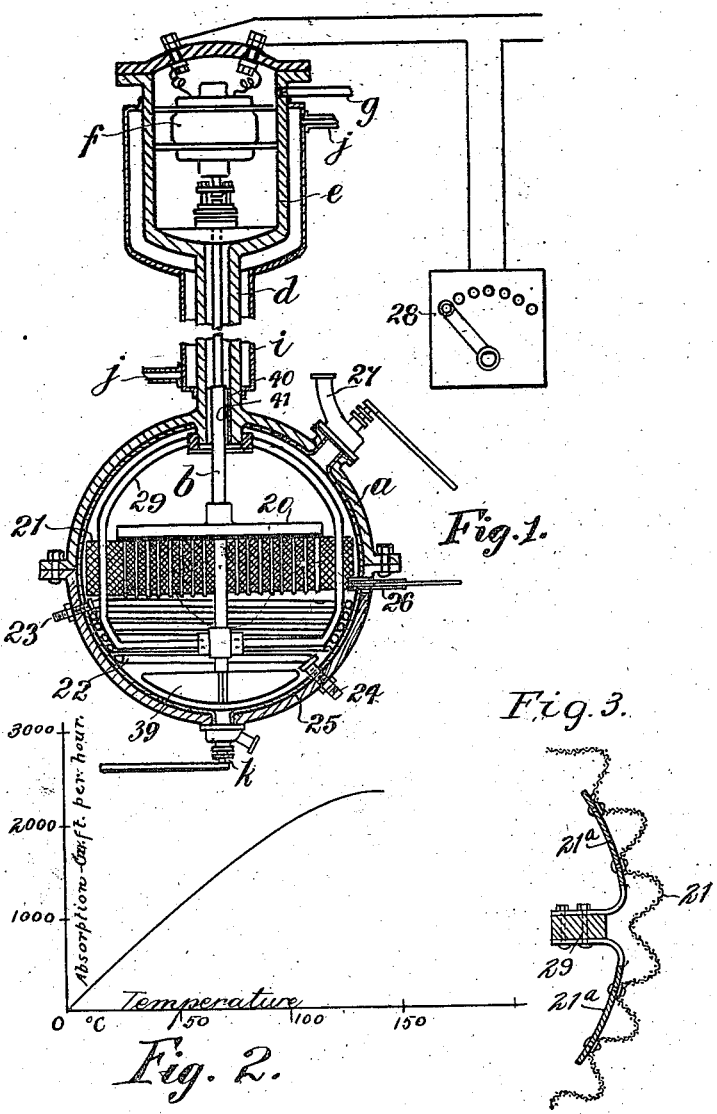

UNITED STATES PATENT OFFICE.

GEORGE CALVERT, OF LONDON, ENGLAND.

PROCESS FOR THE HYDROGENIZATION OF OILS.

1,142,668.        Specification of Letters Patent.        Patented June 8, 1915.

Application filed August 26, 1914. Serial No. 858,705.

*To all whom it may concern:*

Be it known that I, GEORGE CALVERT, a subject of the King of Great Britain, residing at London, England, have invented certain new and useful Improvements in Processes for the Hydrogenization of Oils, of which the following is a specification.

This invention relates to the hydrogenizing of oils and analogous operations by catalytic methods. The addition of hydrogen to an unsaturated oil is effected most advantageously under heat and pressure with intimate mixture of the hydrogen oil and catalyst. I have discovered, however, that the results are improved when in addition to pressure there are repeated shocks or impacts applied to the hot mixture under pressure. Such a shock cannot be obtained readily by aid of a spray.

According to the present invention the oil is hydrogenized by subjecting a hot mixture of oil and catalyst under pressure and in the presence of hydrogen to repeated mechanical shocks or impacts. This may be effected by means of a centrifugal pump or circulator or by rotary beaters. As this method of operation involves the use of mechanical means for imparting the shock, difficulties arise in maintaining the required degree of pressure of the hydrogen to secure effective hydrogenization. In treating oil for edible use, it is important to avoid decomposition of the fat and this can best be done by employing high pressures of hydrogen, such high pressures not only prevent decomposition, but they also facilitate the absorption of hydrogen by the fat. According to this invention I employ pressures up to and above 250 lbs. per square inch and treat the hot mixture of oil and catalyst *en masse* by mechanically moving co-mingling means.

The apparatus which I have invented to carry out this process and which enables me to obtain and maintain such high pressures without loss of hydrogen forms the subject matter of a co-pending application filed by me, viz. Serial No. 819523 filed on the 18th of February, 1914, patented December 29, 1914, No. 1,123,092.

The invention will now be described with reference to the accompanying drawings which illustrate an apparatus substantially similar to the apparatus described in my co-pending application Serial No. 819523.

In the accompanying drawings Figure 1 is a sectional elevation of a suitable apparatus. Fig. 2 is a diagram illustrating the rate of absorption with increase of temperature. Fig. 3 is a partial view in plan of a portion of the screen.

The mixture of oil and catalyst is supplied to a closed container $a$, which is preferably of spherical form to withstand the high pressures employed. This vessel is fitted with a copper lining 25 and contains a co-mingling device which imparts shocks or impacts to the oil and catalyst. In the form shown the co-mingling device embodies a propeller or centrifugal blade 39 at the base and rotary agitators 20 in the form of a comb. These rotary or moving parts are mounted on a shaft $b$ which is driven by a motor $f$. The motor $f$ is inclosed in a casing $e$ which is isolated or remote from the vessel $a$, but is connected thereto by a pipe or channel $d$. The pipe $d$ may be provided as shown with a cooling jacket $i$ through which water is circulated by pipes $j$. The hydrogen is supplied to the apparatus by the pipe $g$. There is free communication between the interior of the casing $e$, and the interior of the vessel $a$, so that none of the moving parts require to be packed with stuffing boxes or like packing. To enable this free communication the sleeve 40 surrounding the shaft $b$ is provided with longitudinal ports or channels 41, or this sleeve may be of greater internal diameter than the shaft $b$ to provide an annular passage around the shaft.

A yoke 29 extends from the top of the vessel around the side to support a bearing 42 for the shaft $b$. A screen 21 is fixed about the comb 20 and this gauze screen is preferably corrugated. A partial plan view of the screen 21 is shown in Fig. 3, where the corrugated screen is shown supported from the yoke 29 by arms 21$^a$. The mixture of oil and catalyst is maintained at the desired temperature by suitable heating means which may be arranged internally or externally. In the form illustrated a steam coil 22 is arranged inside the vessel and this coil has its inlet at 23 and its outlet at 24. A valve or cock $k$ is provided for enabling the mixture after treatment to be run off. A controller 28 is provided for controlling the speed of the motor.

In operation any suitable catalyst may be employed. The temperature is chosen with regard to the kind of oil to be treated. It will be found on trial that there is a comparatively small range of temperature at which absorption is most active. The curve showing the rate of absorption and the temperature follows practically in a straight line law till a certain point is reached when it ceases to have an upward inclination and passes over into substantially horizontal line. This curve is indicated in Fig. 2, which is the approximate curve for fish oil. The rate of absorption is also increased with the pressure and especially in the case of vegetable oils intended for food purposes the pressure should be high to prevent decomposition. The pressure in the case of food oils should be above 250 lbs. per square inch, and may be as high as 500 lbs. to 600 lbs. per square inch. In addition to the action of heat and pressures the mixture is subjected to repeated impacts and the circulating blade 39 insures the frequent repetition of these impacts. The chief factors of this process therefore reside in the application of heat pressure, impacts and circulation. With this method a charge of oil can be hydrogenized very effectively at a comparatively low cost and in a relatively short space of time. Whale oil has been deodorized in 20 minutes, and hydrogenized to a hard fat in 55 minutes. The approach of the point of saturation can be readily observed by observing the absorption of the hydrogen by a suitable gage on the hydrogen supply pipe. With this apparatus there can be no leakage of hydrogen so that the gage gives a correct indication of the rate of absorption. With favorable conditions fish oil will absorb hydrogen at the rate of about 2,400 cubic feet per hour. The rate of absorption, however, varies with different oils and also with the catalyst and pressure and temperature.

The hydrogen and catalyst are not merely impacted, but the impacting is effected in a rapid series. The oil and catalyst are raised by the circulating member 39 to be beaten along with the hydrogen by the comb 20 and by centrifugal action this oil and catalyst are hurled against the screen 21 where it is again broken up and exposed to the stream of hydrogen. The liquid then drops into the bottom to be immediately passed through the same rapid succession of impacts. Then again not only do the comb and screen form agents for the impact but they also constitute anvils as the oil particles and hydrogen mutually impact each other on these anvils. The functions of the comb and screen are further to effect graduated comminution of the mixture during the process of impacting. The mechanical impacting is thus a graduated one. The comb 20 in impacting the stream from the circulating member 39 also splits this stream up into smaller bodies and these drops are again further split up by the screen simultaneously with the impacting.

I claim:—

1. The method of hydrogenizing oils which consists in subjecting a mixture of oil and catalyst to the action of heat and pressure in a vessel in the presence of hydrogen and imparting graduated mechanical impacts to said hydrogen, oil and catalyst within said vessel.

2. The method of hydrogenizing oils which consists in subjecting a mixture of oil and catalyst to the action of heat and pressure in a vessel in the presence of hydrogen, imparting graduated mechanical impacts to said hydrogen, oil and catalyst within said vessel, and circulating said oil and catalyst to repeat the mechanical impacting frequently in rapid succession.

3. The method of hydrogenizing oils which consists in subjecting a mixture of oil, hydrogen and a catalyst to the action of heat and pressure at and above 250 lbs. per square inch in a closed vessel and imparting graduated mechanical impacts in rapid succession to said oil, hydrogen and catalyst.

4. The method of hydrogenizing oils which consists in subjecting a mixture of oil and catalyst to the action of heat and pressure in a vessel in the presence of hydrogen, imparting graduated mechanical impacts to said hydrogen, oil and catalyst within said vessel, and comminuting the oil and catalyst during said impacting.

In testimony whereof I have signed my name to this specification in the presence of two subscribing witnesses.

GEORGE CALVERT.

Witnesses:
PETER S. H. ALEXANDER,
H. MATHYS.